March 6, 1962  J. OSTLER  3,024,376
ELECTRIC MOTOR WITH ROTATABLE CONNECTOR
Filed Sept. 5, 1958

United States Patent Office 3,024,376
Patented Mar. 6, 1962

3,024,376
ELECTRIC MOTOR WITH ROTATABLE CONNECTOR
Josef Ostler, Munich, Germany, assignor to Hans Deckel, Munich, Germany, and Friedrich Wilhelm Deckel, Zug, Switzerland
Filed Sept. 5, 1958, Ser. No. 759,333
Claims priority, application Germany Sept. 13, 1957
5 Claims. (Cl. 310—71)

The invention relates to a machine tool in which a motor for driving a working spindle, such as a planetary grinding spindle in a grinding machine, revolves bodily about a central axis on the tool head when the machine is in operation.

The object of the invention is to provide simple electrical connections between the revolving motor and the stationary source of power supply, suitably arranged to prevent without supplementary locking means the cables from becoming entangled and twisted during the planetary motion of the motor, and from thus causing delay and troublesome interruptions, damage, and so forth, during the progress of the work. Another object of the invention is to arrange the connections in such a way that they will not be in the way and impede observation of the work during machining.

The invention proposes to form the carrier of the connecting elements as a ring-shaped element which is rotatably mounted on the motor casing, while the connecting elements are radially extending from the said ring-shaped element. Conveniently the ring may run in antifriction, such as ball bearings. In a special type of motor equipped with sliprings a particular feature of the invention consists in accommodating the carbon brushes which slide on the sliprings and which are connected with the electric supply cables, inside a hollow projecting bulge in the ring-shaped element.

Figure 1:
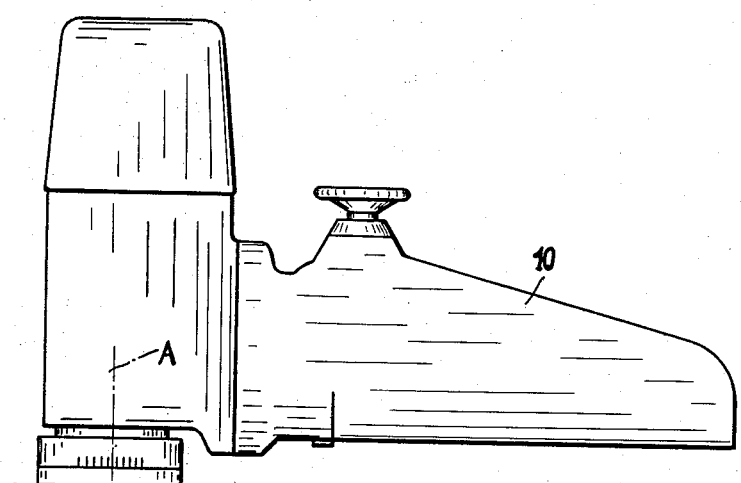
Figure 2:
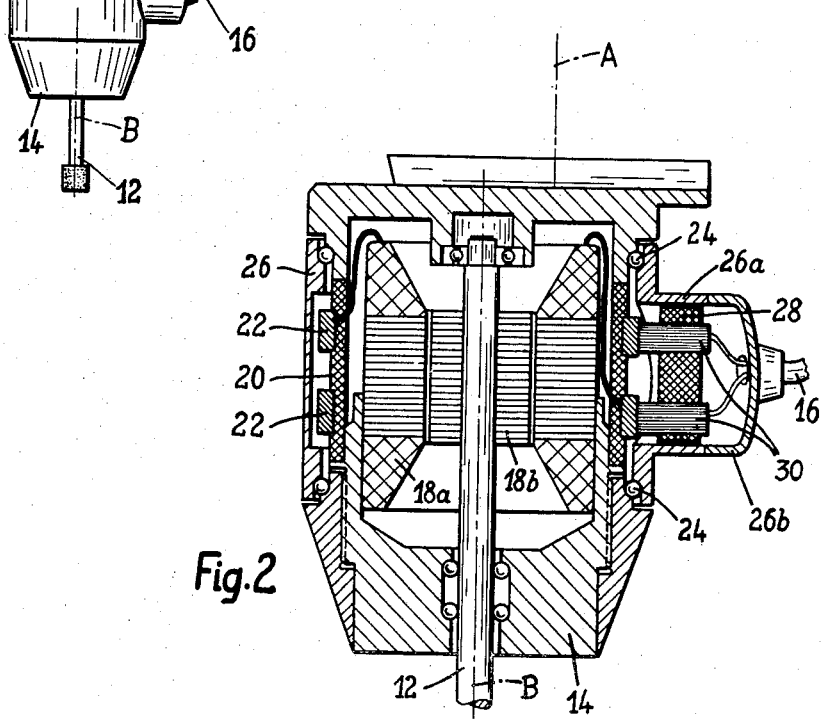

Other features of the invention will be described in conjunction with an illustrative embodiment thereof shown in the accompanying drawings in which FIG. 1 is a general view of a grinding head with a planetary grinding spindle and a motor mounted thereon, and FIG. 2 is a longitudinal section through the motor drawn to a larger scale.

The illustrative example relates to a machine tool with a detachable grinding head 10 in which the working spindle 12 and the motor 14 for driving the same revolve about a central main axis A. Arrangements of this kind are already known and require no further detailed description.

Since motor 14 revolves about the main axis A of the grinding head, and whereas the axis B of the grinding spindle 12 may be adjustably offset in relation thereto, special arrangements are needed for the connections which supply the motor with current to prevent the cable 16 from becoming entangled and twisted when the motor 14 revolves.

As will be readily seen by reference to the cross section shown in FIG. 2 the casing 14, in the illustrated example consisting of several parts, of the motor, in the present instance an electric motor comprising a stator 18a and a rotor 18b which drives the spindle 12, is fitted with an insulating ring 20 which on its periphery carries two sliprings 22 each electrically connected in conventional manner with one end of the windings on stator 18a.

Mounted freely rotatably in ball bearings 24 on the periphery of the cylindrical casing 14 is a ring-shaped element 26 which on one side of its circumference has a cup-shaped hollow outwardly projecting bulge 26a. Inside this cup-shaped bulge are two carbon brushes 30 insulatedly mounted in a holder 28, each brush being in slidable contact with one of the sliprings 22. The carbon brushes are connected with the conductors of a supply cable 16 which enters the cup-shaped bulge 26a through a cover plate 26b.

By arranging the ring-shaped element which carries the electrical connections for the motor in the manner proposed by the present invention, the ring-shaped element 26 carrying the connecting elements will be held against a joint-motion during the revolving motion of the motor by the cable 16 being inserted between said stationary source of power supply and the connecting elements radially extending from the ring-shaped element. In this way an arrangement is provided in which, without supplementary locking means, the ring-carrier remains substantially stationary in relation to the surroundings. Twisting of the cable is thereby prevented and troublesome interruptions due to disconnection or fracture of the cable will not occur. Moreover, the ring-carrier occupies no supplementary space in the axial direction of the working spindle, which is useful in the case of compact arrangements. Another useful feature of the proposed arrangement is that the cable 16 can be taken to a suitable point in any direction. The provision of an antifriction mounting (ball bearings) between motor casing and ring-shaped element likewise ensures said relative movement between the ring-shaped element and the motor casing which carries the grinding spindle can have no adverse effect on the spindle bearings.

The invention is not limited to the particular form of construction herein described. The specific details of the arrangement may take the form of alternative structural elements of different shapes, the characteristic feature of the invention being the provision of the electrical connections for supplying current to the motor on an element arranged to be freely rotatable in relation to the motor casing. Connections of the kind proposed by the invention might also be employed in conjunction with motors used in other applications, for instance for driving air turbines or other types of machine tool.

It is seen from the foregoing disclosure that the above mentioned objects of the invention are well fulfilled. It is to be understood that the foregoing disclosure is given by way of illustrative example only, rather than by way of limitation, and that without departing from the invention, the details may be varied within the scope of the appended claims.

What is claimed is:

1. An electric motor having a shaft providing a drive spindle revolving bodily about a central axis of rotation, said motor comprising a cylindrical motor casing, a stator and a rotor for driving said shaft mounted in said casing, and a carrier for supporting means for connecting said motor with a flexible coupling energized by a stationary source of power supply, said carrier including a ring freely rotatably mounted on the periphery of said cylindrical motor casing for rotation independent of that of said rotor and shaft, said electric motor being adapted to be mounted on a rotatable machine tool part with its shaft extending substantially vertically whereby said motor stator may turn freely within said carrier ring while said carrier ring remains in a given position of orientation with respect to said flexible coupling, to prevent said flexible coupling from becoming entangled and twisted.

2. A construction as defined in claim 1, including an insulating ring fixed on the circumference of said cylindrical motor casing inwardly of said carrier, and slip rings mounted on said insulating ring in contact with said means for connecting said motor with said flexible coupling, said slip rings being electrically connected with said stator.

3. An electric motor having a shaft providing a drive spindle revolving bodily about a central axis of rotation, said motor comprising a cylindrical motor casing, a stationary stator and a movable rotor for driving said shaft mounted in said casing, an insulating ring fixed on the circumference of said motor casing, a pair of spaced slip rings secured to said insulating ring, a carrier ring freely rotatably mounted on said motor casing outwardly of said insulating ring, said carrier ring having an opening and a projecting cup mounted about said opening, means for supporting a pair of spaced brushes in said cup extending through said opening into contact with said slip rings, and a flexible coupling having one end secured to said cup and electrically coupled to said brushes, the other end of said flexible coupling being adapted to be connected to a stationary source of power supply, said electric motor being adapted to be mounted on a rotatable machine tool part with its shaft extending substantially vertically whereby said motor casing and slip rings may bodily rotate freely with respect to said carrier ring and flexible coupling while said carrier ring and coupling remain substantially non-rotary, to prevent said flexible coupling from becoming entangled and twisted.

4. A machine tool of the type comprising a grinding head including a support mounted for rotation about an axis, and an electric motor unit mounted on said support, said motor unit including a motor casing and a tool spindle supported from and rotatable with respect to said casing, said casing being secured to said support to rotate bodily therewith in a position in which said tool spindle is parallel to and offset laterally from said axis of rotation of said support, characterized by the novel features that said motor casing has a plurality of electric conducting rings encircling said casing in spaced and insulated relation to each other, a housing ring encircling and covering said conducting rings and spaced from them, said housing ring being mounted on said motor casing for rotation thereon coaxially with said conducting rings, an electric supply cable secured to said housing ring and extending laterally therefrom to a source of current, and a plurality of electric contact brushes mounted on said housing ring and electrically connected to said cable and respectively making rubbing contact with said conducting rings, so that during rotation of said support with respect to said grinding head and consequent bodily rotation of said motor casing, electric current may be supplied to said motor unit through said supply cable without twisting said cable because said housing ring may remain in a given position of orientation with respect to said cable while said motor casing rotates bodily within said housing ring.

5. A construction as defined in claim 4, in which said conducting rings and the axis of rotation of said housing ring with respect to said casing are all substantially coaxial with said tool spindle of said motor unit.

References Cited in the file of this patent
UNITED STATES PATENTS

| | | |
|---|---|---|
| 1,288,511 | Clarke | Dec. 24, 1918 |
| 2,449,138 | Phillips | Sept. 14, 1948 |

FOREIGN PATENTS

| | | |
|---|---|---|
| 493,774 | Italy | May 6, 1954 |